(12) United States Patent
Michelsson et al.

(10) Patent No.: US 10,320,316 B2
(45) Date of Patent: Jun. 11, 2019

(54) SUPPLYING A SYNCHRONOUS MACHINE WITH AN EXCITATION CURRENT

(71) Applicant: Siemens Aktiengesellschaft, Munich (DE)

(72) Inventors: Olaf Michelsson, Arnstadt (DE); Marcus Banda, Erfurt (DE); Martin Hiller, Erfurt (DE)

(73) Assignee: Siemens Aktiengesellschaft, Munich (DE)

( * ) Notice: Subject to any disclaimer, the term of this patent is extended or adjusted under 35 U.S.C. 154(b) by 2 days.

(21) Appl. No.: 15/320,657

(22) PCT Filed: Jun. 24, 2015

(86) PCT No.: PCT/EP2015/064199
§ 371 (c)(1),
(2) Date: Dec. 20, 2016

(87) PCT Pub. No.: WO2016/001024
PCT Pub. Date: Jan. 7, 2016

(65) Prior Publication Data
US 2017/0163192 A1    Jun. 8, 2017

(30) Foreign Application Priority Data
Jul. 1, 2014    (EP) .................................... 14175213

(51) Int. Cl.
*H02P 9/00*    (2006.01)
*H02P 9/30*    (2006.01)

(52) U.S. Cl.
CPC .................... *H02P 9/302* (2013.01)

(58) Field of Classification Search
CPC ...................................... H02P 9/302
(Continued)

(56) References Cited

U.S. PATENT DOCUMENTS 3,702,965 A * 11/1972 Drexler .................. H02K 19/28
310/162
3,768,002 A * 10/1973 Drexler .................. H02K 19/30
322/25
(Continued)

FOREIGN PATENT DOCUMENTS

CN    101510747 A    8/2009
CN    101610060 A    12/2009
(Continued)

OTHER PUBLICATIONS

EP Search Report dated Dec. 16, 2014, for EP patent application No. 14175213.9.
(Continued)

*Primary Examiner* — Julio C. Gonzalez
(74) *Attorney, Agent, or Firm* — Beusse Wolter Sanks & Maire

(57) ABSTRACT

A regulating device for a brushless excitation system for supplying at least one excitation coil of a rotor of a synchronous machine with excitation current, having a detection device to detect a strength of a magnetic flux; a regulating unit to generate an auxiliary excitation DC current supplied to the main excitation machine by rectifying an auxiliary excitation three-phase current, and to regulate the current strength of the auxiliary excitation DC current such that a magnetic flux generated between the rotor and the stator of the main excitation machine is kept constant independently of the current strength of the excitation current; and an adjusting unit rotationally fixed to a rotor shaft of the synchronous machine to generate the excitation current by rectifying an excitation three-phase voltage generated by the main excitation machine and to regulate the current strength of the excitation current supplied to the rotor of the synchronous machine.

12 Claims, 2 Drawing Sheets

(58) Field of Classification Search
USPC .................. 290/7, 52, 40 R; 322/44, 59
See application file for complete search history.

(56) References Cited

U.S. PATENT DOCUMENTS

| | | | | |
|---|---|---|---|---|
| 3,965,379 | A | | 6/1976 | Meusel et al. |
| 4,164,705 | A | * | 8/1979 | Whitney ................ H02H 7/065 |
| | | | | 310/68 D |
| 4,728,879 | A | * | 3/1988 | Rounce .................. H02P 9/302 |
| | | | | 322/25 |
| 4,755,736 | A | * | 7/1988 | Fluegel ................. H02K 19/38 |
| | | | | 310/113 |
| 4,764,838 | A | | 8/1988 | MacFarlane |
| 4,772,802 | A | * | 9/1988 | Glennon ................ F02N 11/04 |
| | | | | 290/31 |
| 4,939,441 | A | * | 7/1990 | Dhyanchand ........... F02N 11/04 |
| | | | | 290/46 |
| 4,982,123 | A | * | 1/1991 | Raad ....................... F02N 11/04 |
| | | | | 290/46 |
| 5,581,168 | A | * | 12/1996 | Rozman .................. F02N 11/04 |
| | | | | 290/22 |
| 7,122,994 | B2 | * | 10/2006 | Anghel ................... F02N 11/04 |
| | | | | 322/60 |
| 7,309,974 | B2 | * | 12/2007 | Sarlioglu ............... F01D 15/10 |
| | | | | 290/4 D |
| 9,041,232 | B2 | * | 5/2015 | Shah ...................... H02K 19/24 |
| | | | | 290/1 A |
| 9,209,741 | B2 | * | 12/2015 | Gao ....................... F02N 11/04 |
| 9,459,320 | B2 | * | 10/2016 | Viswanathan ....... G01R 31/343 |
| 2003/0085691 | A1 | | 5/2003 | Yao et al. |
| 2012/0153904 | A1 | | 6/2012 | Albsmeier |
| 2012/0187923 | A1 | | 7/2012 | Lehmann |
| 2012/0211981 | A1 | * | 8/2012 | De Wergifosse ....... F02C 7/275 |
| | | | | 290/31 |

FOREIGN PATENT DOCUMENTS

| | | |
|---|---|---|
| CN | 201699499 U | 1/2011 |
| CN | 103532454 A | 1/2014 |
| DE | 2366003 A1 | 5/1977 |
| DE | 102010060998 A1 | 6/2012 |
| EP | 0254129 A1 | 1/1988 |
| EP | 2262101 A1 | 12/2010 |
| JP | S61135398 A | 6/1986 |
| JP | 2005509398 A | 4/2005 |
| JP | 2006352990 A | 12/2006 |
| JP | 2013236480 A | 11/2013 |
| WO | 2013079761 A1 | 6/2013 |

OTHER PUBLICATIONS

International Search Report dated Sep. 22, 2015, for PCT application No. PCT/EP2015/064199.
CN search report dated Apr. 28, 2018, for CN patent application No. 201580036424.6.

* cited by examiner

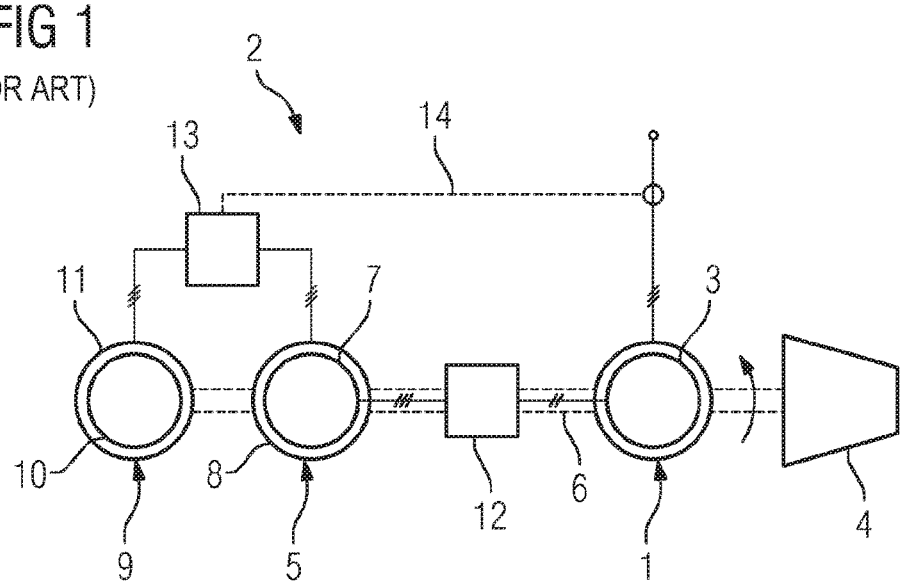
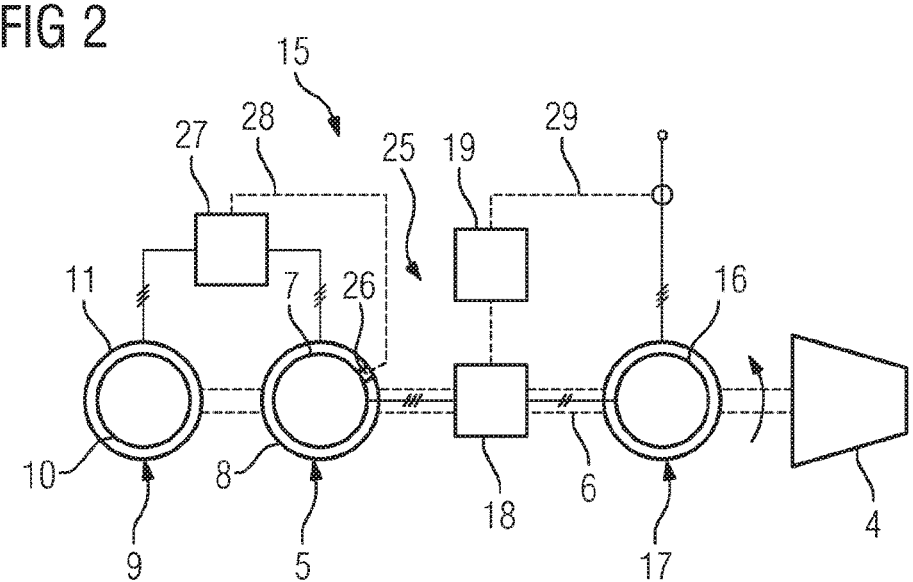

SUPPLYING A SYNCHRONOUS MACHINE WITH AN EXCITATION CURRENT

CROSS REFERENCE TO RELATED APPLICATIONS

This application is the US National Stage of International Application No. PCT/EP2015/064199 filed Jun. 24, 2015, and claims the benefit thereof. The International Application claims the benefit of European Application No. EP14175213 filed Jul. 1, 2014. All of the applications are incorporated by reference herein in their entirety.

FIELD OF INVENTION

The invention relates to an excitation system for supplying at least one excitation winding of a rotor of a synchronous machine, in particular a turbogenerator, with an excitation current.

Furthermore, the invention relates to a brushless excitation system for supplying at least one excitation winding of a rotor of a synchronous machine, in particular a turbogenerator, with an excitation current.

Further, the invention relates to a method for supplying at least one excitation winding of a rotor of a synchronous machine, in particular a turbogenerator, with an excitation current.

BACKGROUND OF INVENTION

Synchronous machines in the form of turbogenerators are used in power plants to generate electrical energy. For this purpose, a turbogenerator is mechanically coupled to at least one gas turbine and/or steam turbine, the turbogenerator and the gas turbine or steam turbine together constituting a turbo set. Alternatively, a synchronous machine can be operated in a phase-shifter operating mode.

In the case of a turbogenerator, a magnetic direct-current excitation field, required for generating a generator voltage, is generated in the rotor of the turbogenerator.

A static excitation system may be used for the purpose of supplying the excitation windings of a rotor of a turbogenerator. In the case of a static excitation system, an excitation power is transmitted to the excitation windings of the rotor of the turbogenerator via a stationary current converter, stationary carbon brushes and sliprings that are disposed on a rotor shaft of the turbogenerator. This static excitation can react very rapidly to load change, this having an associated speed advantage with respect to regulating technology in comparison with brushless excitation systems. This speed advantage with respect to regulating technology is becoming very important at the present time since, in the course of a global energy transition, the feed-in units are changing, from large power plants for feeding electrical energy into power grids, toward smaller, decentralized regenerative energy generators, and consequently generate a greater dynamic in the power grids. Owing to the fact that the carbon brushes have to be replaced regularly, however, a static energy system is considered to be maintenance-intensive. Furthermore, the supply voltage of a static excitation system is drawn primarily from the generator terminals, such that, during a power grid fault, in the least favorable case, no ceiling voltage can be supplied to the excitation windings of the turbogenerator.

Alternatively, a brushless excitation system may be used to supply the excitation windings of a turbogenerator. In the case of a brushless excitation system, the excitation windings of the rotor of the turbogenerator are connected to the alternating-current windings of a rotor of a main excitation machine, realized as an external-pole machine, via a diode rectifier that rotates concomitantly with the rotor. The external-pole windings of the main excitation machine are fed from a permanently excited auxiliary excitation machine, via a voltage regulator. It is possible to dispense entirely with the maintenance-intensive use of brushes, a brushless excitation system being considered to be virtually maintenance-free. Moreover, unlike the static excitation, a brushless excitation is able to continue to supply the full power to the excitation windings of the rotor of a turbogenerator in the case of a power grid fault. Owing to the large excitation time constant of a brushless excitation system, correction of an excitation current supplying the excitation windings of the rotor of a turbogenerator is effected much more slowly, in comparison with the static excitation, in the case of rapid load changes in the connected power grid. Turbogenerators having brushless excitation are becoming less and less able to fulfill the constantly increasing minimum requirements of the power grid operators for all feed-in units in respect of a dynamic response in the case of load changes, the voltage stability in the supply grid and in the case of transient disturbances. The excitation power generated by an excitation system is usually approximately 0.5% to approximately 5% of the rated apparent power of a turbogenerator.

WO 2013/079761 A1 discloses a rotating electrical machine and a method for magnetizing a rotor of a brushless rotating machine, the method comprising forming a static magnetic field, rotating the rotor of an excitation machine in the static magnetic field for the purpose of generating an alternating current, rectifying the alternating current by means of a controllable bridge disposed on the rotor, receiving control information wirelessly in the rotor, controlling a current intensity by means of the controllable bridge on the basis of the control information, and feeding the current into a magnetizing winding of the rotating electrical machine.

DE 23 66 003 A1 discloses an arrangement for a rotating semiconductor excitation in the case of turbogenerators, in which there is provided at least one current converter wheel, the carrier disk of which is realized as a hub that is connected to the shaft in a rotationally fixed manner and that has an axially extending hollow-cylinder extension. Semiconductor modules, having heat sinks and protective circuitry, are disposed in the inside diameter of the extension. Furthermore, controlled thyristors are provided as semiconductor valves, and the carrier disk of the current converter wheel has a further hollow-cylinder extension, which is opposite the said hollow-cylinder extension, and on the internal diameter of which the control units for the thyristors are disposed in an isolated manner. Attached to the outer casing of the carrier disk is the rotating part of a solid-state, non-contacting signal transmission device, the stationary part of which is fastened in the machine housing.

DE 10 2010 060 998 A1 discloses a brushless synchronous generator having a stator that has at least one main winding, and at least one auxiliary winding for generating an excitation field, and having a rotor that has a main excitation winding with salient-pole geometry. The synchronous generator is distinguished in that the rotor still has an auxiliary excitation winding with non-salient-pole geometry that is attached, with the main excitation winding, to a common armature and is connected thereto via a rectifier bridge disposed on the rotor. In a generator arrangement having such a brushless synchronous generator, at least one capacitor is provided, which constitutes a resonant circuit with the auxiliary winding of the stator.

EP 2 262 101 A1 discloses an arrangement having an electrical generator, and having a steam turbine and an excitation device, the excitation device being realized in such a manner that, during nominal operation, the auxiliary excitation machine is realized as a permanently excited synchronous machine and, in turning operation, the auxiliary excitation machine is realized as a synchronous motor, or turning motor.

EP 0 254 129 A1 discloses a brushless synchronous generator, which is coupled to a constantly excited excitation machine whose voltage is rectified by means of a rectifier and supplied to the excitation winding of the synchronous generator. The voltage changes caused by loads can easily be corrected, in that a Hall sensor, the Hall voltage of which serves to control the excitation current, is disposed in the air gap of the synchronous generator.

US 2012/153904 A1 discloses a generator having a field coil, which generates a magnetic field that induces electricity in a coil arrangement. A field-coil excitation system has a generator that has an output coil arrangement for generating a.c. voltage. A rectifier converts the a.c. voltage into d.c. voltage at two nodes. A capacitor between the nodes realizes a resonant circuit, as a result of which voltage and current oscillate with a predefined phase shift. A switch and the field coil are connected in series between the nodes. A control unit switches the switch to conducting for a predefined time period. Following the end of the time period, the occurrence of a minimal current causes the switch to become non-conducting. The predefined phase shift enables the minimal current to be detected.

SUMMARY OF INVENTION

The object of the invention is to combine the advantages of the static excitation with the advantages of the brushless excitation.

The regulating device according to the invention for a brushless excitation system for supplying at least one excitation winding of a rotor of a synchronous machine, in particular a turbogenerator, with an excitation current comprises:—at least one sensing device, designed to sense an intensity of a magnetic flux generated between a rotor and a stator of a main excitation machine, or at least one parameter associated with this magnetic flux;—at least one regulating unit, which can be connected between an auxiliary excitation machine and the main excitation machine, and which is designed to generate an auxiliary excitation direct current that can be supplied to the main excitation machine by rectifying an auxiliary excitation three-phase current generated by the auxiliary excitation machine, and which is designed to regulate the current intensity of the auxiliary excitation direct current in such a manner that a magnetic flux generated between the rotor and the stator of the main excitation machine is kept constant independently of the current intensity of the excitation current that can be supplied to the excitation winding of the rotor of the synchronous machine; and—at least one adjusting unit, which is connected in a rotationally fixed manner to a rotor shaft of the synchronous machine, is connected between the rotor of the main excitation machine and the excitation winding of the rotor of the synchronous machine, and is designed to generate the excitation current by rectifying an excitation three-phase voltage generated by the main excitation machine and to regulate the current intensity of the excitation current that can be supplied to the rotor of the synchronous machine.

Owing to the adjusting unit, or the thereby effected indirect regulation of the current intensity of the excitation current that can be supplied to the rotor of the synchronous machine, a brushless excitation system provided with a regulating device according to the invention can react very rapidly to load changes, corresponding to static excitation systems, this having the associated speed advantage with respect to regulating technology. For this purpose, an active rectification must be implemented on the rotor shaft. In particular, positive and negative excitation voltages can be generated by means of the adjusting unit, it being possible to effect a rapid de-excitation of the excitation winding of the rotor of the synchronous machine by means of negative excitation voltages. The concept of the brushless excitation can thereby be considerably expanded and improved. By means of the regulating device according to the invention, therefore, regulating behavior and stability of a synchronous machine can be improved, in order to fulfill generally increased minimum requirements of the power grid operators for feed-in units connected to a power supply grid, thereby enabling a global energy transition to be supported.

A minimum requirement for feed-in unit is, for example, a requirement in respect of reference voltage jumps in the no-load operation of a synchronous machine, from 1 pu to 0.9 pu within often described 800 ms for brushless excitation systems at low temperatures. Without an active de-excitation of a synchronous machine, or of the excitation winding of its rotor, as is the case with conventional brushless excitation systems, such requirements are scarcely realizable for large air-cooled synchronous machines. By means of the regulating device according to the invention, on the other hand, appropriate de-excitation of the synchronous machine can be effected. Moreover, in the case of sudden load reductions in a power supply grid, it is necessary for an occurring overvoltage to be corrected as rapidly as possible, this being possible by means of the adjusting unit of the regulating device according to the invention. Moreover, for the purpose of maintaining the stability of a synchronous machine during a grid fault in the power supply grid, at the moment of the resumption of the power grid voltage it is necessary, according to corresponding minimum requirements of the power supply grid operators for feed-in units, for a synchronous machine to be run in maximum over-excitation in 200 ms to 250 ms, this likewise being possible by means of the regulating device according to the invention, or its adjusting unit. In order to achieve this state of maximum over-excitation as rapidly as possible, there is a need for an excitation time constant that is as small as possible, which can be achieved by use of the regulating device according to the invention.

Owing to the use, according to the invention, of the adjusting unit, or its functionalities—instead of the conventional use of passive, or non-controllable, rectifier units, in combination with an excitation of an excitation winding of the rotor of a synchronous machine effected directly by supplying current to a main excitation machine—it is advantageous for regulation of the current intensity of the excitation current that can be supplied to the rotor of the synchronous machine if an excitation three-phase voltage generated by the main excitation machine is of a constant level. This can be achieved by means of the regulating unit of the regulating device according to the invention, by means of which, for this purpose, the current intensity of the auxiliary excitation direct current that can be supplied to the main excitation machine is regulated in such a manner that a magnetic flux generated between the rotor and the stator of the main excitation machine is kept constant independently of the current intensity of the excitation current that can be supplied to the excitation winding of the rotor of the synchronous machine. As a result of the magnetic flux being kept constant, the level of the excitation three-phase voltage generated by the main excitation machine is kept constant.

By means of the regulating device according to the invention, the conventional advantages of brushless excitation can thus be combined with the advantages of a static excitation, in particular the regulation advantages thereof.

The sensing device can directly measure the intensity of the magnetic flux between the rotor and the stator of a main excitation machine. Alternatively, the sensing device can be used to sense at least one parameter, associated with this magnetic flux, that allows inference of the respective intensity of the magnetic flux between the rotor and the stator of the main excitation machine. There may also be two or more corresponding sensing devices.

For the purpose of regulating the current intensity of the excitation current that can be supplied to the rotor of the synchronous machine, the adjusting unit may be connected by communication means to a regulating electronics system that compares an actual current intensity of a three-phase current, generated by the synchronous machine, with a predefined reference current intensity, in order to effect regulation of the current intensity of the excitation current that can be supplied to the rotor of the synchronous machine. Alternatively, the adjusting unit may itself comprise a corresponding regulating electronics system.

Advantageously, the adjusting unit has at least one controllable rectifier unit. Such a controllable rectifier unit can be used to effect both the rectification of the excitation three-phase voltage generated by the main excitation machine and the regulation of the current intensity of the excitation current that can be supplied to the rotor of the synchronous machine. For this purpose, the controllable rectifier unit may have controllable rectifiers.

The brushless excitation system according to the invention for supplying at least one excitation winding of a rotor of a synchronous machine, in particular a turbogenerator, with an excitation current comprises:—at least one main excitation machine, realized as a rotating electrical external-pole machine, which has a rotor, having rotor windings, that is connected in a rotationally fixed manner to a rotor shaft of the synchronous machine, and which has a stator having external-pole windings, wherein the rotor windings can be connected in an electrically conducting manner to the excitation winding of the rotor of the synchronous machine;—at least one auxiliary excitation machine, realized as a permanently excited electrical internal-pole machine, which has a rotor, having permanent magnets, that is connected in a rotationally fixed manner to the rotor shaft of the synchronous machine, and which has a stator having stator windings, wherein the stator windings can be connected in an electrically conducting manner to the external-pole windings of the main excitation machine; and—at least one regulating device according to any one of the said designs or any combination of the same.

The advantages and embodiments mentioned above with reference to the regulating device are correspondingly associated with the brushless excitation system. The rotor windings of the main excitation machine can be connected in an electrically conducting manner to the excitation winding of the rotor of the synchronous machine via the adjusting unit, in particular a concomitantly rotating rectifier, that is connected in a rotationally fixed manner to the rotor shaft of the synchronous machine. The stator windings of the auxiliary excitation machine can be connected in an electrically conducting manner to the external-pole windings of the main excitation machine via an actuator.

The method according to the invention for supplying at least one excitation winding of a rotor of a synchronous machine, in particular a turbogenerator, with an excitation current comprises the steps:—generating a constant excitation three-phase voltage by means of a main excitation machine, of which the rotor is connected in a rotationally fixed manner to the rotor of the synchronous machine;—generating the excitation current by rectifying the constant excitation three-phase voltage by means of an adjusting unit that is connected in a rotationally fixed manner to the rotor of the synchronous machine; and—regulating the current intensity of the excitation current by means of the adjusting unit.

The advantages mentioned above with reference to the regulating device are correspondingly associated with this method. In particular, the regulating device may be designed to execute the method.

Advantageously, at least one controllable rectifier unit is used as an adjusting unit. Such a controllable rectifier unit can be used to effect both the rectification of the excitation three-phase voltage generated by the main excitation machine and the regulation of the current intensity of the excitation current that can be supplied to the rotor of the synchronous machine. For this purpose, the controllable rectifier unit may have controllable rectifiers.

Advantageously, the constant excitation three-phase voltage is generated by regulating a supply of the main excitation machine with a rectified auxiliary excitation three-phase current generated by an auxiliary excitation machine. This implies a constant magnetic flux between the rotor and the stator of the main excitation machine.

BRIEF DESCRIPTION OF THE DRAWINGS

Embodiments of the brushless excitation system according to aspects of the invention are explained in the following on the basis of the appended schematic drawings. There are shown in:

FIG. 1 a schematic representation of a conventional brushless excitation system combined with a turbogenerator;

FIG. 2 a schematic representation of an exemplary embodiment for a brushless excitation system according to the invention combined with a synchronous machine.

DETAILED DESCRIPTION OF INVENTION

Figure 3:
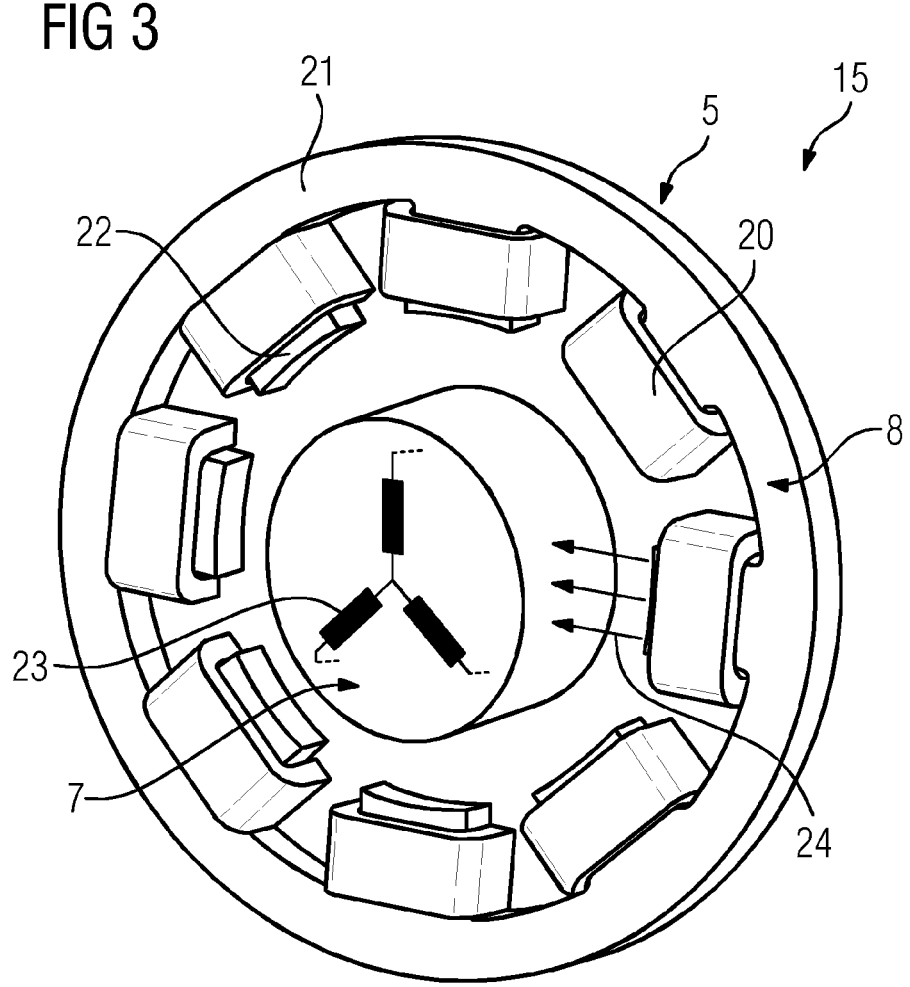
FIG. 3 a schematic and perspective representation of a main excitation machine of an exemplary embodiment for a brushless excitation system according to the invention.

In the figures, components that have the same function are denoted by the same references.

FIG. 1 shows a schematic representation of conventional brushless excitation system 2 combined with a turbogenerator 1, for supplying at least one excitation winding, not shown, of a rotor 3, of the turbogenerator 1 with an excitation current. The turbogenerator 1 is combined with a turbine 4 to form a turbo set.

The excitation system 2 comprises a main excitation machine 5, realized as a rotating electrical external-pole machine, which has a rotor 7, having rotor windings, not shown, that is connected in a rotationally fixed manner to a rotor shaft 6 of the turbogenerator 1, and which has a stator 8 having external-pole windings, not shown, wherein the rotor windings can be connected in an electrically conducting manner to the excitation winding of the rotor 3 of the turbogenerator 1.

Furthermore, the excitation system 2 comprises an auxiliary excitation machine 9, realized as a permanently excited electrical internal-pole machine, which has a rotor 10, having permanent magnets, not shown, that is connected in a rotationally fixed manner to the rotor shaft 6 of the turbogenerator 1, and which has a stator 11 having stator windings, not shown, wherein the stator windings can be connected in an electrically conducting manner to the external-pole windings of the stator 8 of the main excitation machine 5.

The excitation system 2 additionally comprises a rectifier unit 12, which is connected in a rotationally fixed manner to the rotor shaft 6, is connected between the rotor windings of the rotor 7 of the main excitation machine 5 and the excitation winding of the rotor 3 of the turbogenerator 1, and designed for non-controllable, or passive, rectification of a three-phase voltage generated by the main excitation machine 5. For this purpose, the rectifier unit 12 has non-controllable rectifiers, not shown, in the form of interconnected diodes.

The auxiliary excitation machine 9 generates an auxiliary excitation three-phase current, the current intensity of which is regulated and rectified by means of a regulator 13, in order to supply an auxiliary excitation direct current to the main excitation machine 5, or to the external-pole windings thereof. The regulator 13 regulates the current intensity of the auxiliary excitation direct current to be supplied to the main excitation machine 5, and thereby the current intensity of the excitation current to be supplied to the excitation windings of the rotor 3 of the turbogenerator 1, in dependence on a three-phase current to be generated by the turbogenerator 1, as intended to be indicated by the broken line 14 in FIG. 1.

FIG. 2 shows a schematic representation of an exemplary embodiment for a brushless excitation system 15 according to the invention for supplying at least one excitation winding, not shown, of a rotor 16 of a synchronous machine 17 with an excitation current. The synchronous machine is combined with a turbine 4 to form a turbo set.

The brushless excitation system 15 comprises a main excitation machine 5, realized as a rotating electrical external-pole machine, which has a rotor 7, having rotor windings, not shown, that is connected in a rotationally fixed manner to a rotor shaft 6 of the synchronous machine 17, and which has a stator 8 having external-pole windings, not shown. The rotor windings can be connected in an electrically conducting manner to the excitation winding of the rotor 16 of the synchronous machine 17. An exemplary embodiment of a main excitation machine 5 is shown in FIG. 3.

Furthermore, the brushless excitation system 15 comprises an auxiliary excitation machine 9, realized as a permanently excited electrical internal-pole machine, which has a rotor 10, having permanent magnets, not shown, that is connected in a rotationally fixed manner to the rotor shaft 6 of the synchronous machine 17, and which has a stator 11 having stator windings, not shown. The stator windings can be connected in an electrically conducting manner to the external-pole windings of the main excitation machine 5.

The brushless excitation system 15 additionally comprises a regulating device 25.

The regulating device 25 comprises a sensing device 26, designed to sense an intensity of a magnetic flux generated between the rotor 7 and the stator 8 of the main excitation machine 5, or a parameter associated with this magnetic flux.

Furthermore, the regulating device 25 comprises a regulating unit 27, connected between the auxiliary excitation machine 9 and the main excitation machine 5, which is designed to generate an auxiliary excitation direct current that can be supplied to the main excitation machine 5 by rectifying an auxiliary excitation three-phase current generated by the auxiliary excitation machine 9, and which is designed to regulate the current intensity of the auxiliary excitation direct current in such a manner that a magnetic flux generated between the rotor 7 and the stator 8 of the main excitation machine 5 is kept constant independently of the current intensity of the excitation current that can be supplied to the excitation winding of the rotor 16 of the synchronous machine 17.

The regulating device 25 additionally comprises an adjusting unit 18, which is connected in a rotationally fixed manner to the rotor shaft 6 of the synchronous machine 17, is connected between the rotor 7 of the main excitation machine 5 and the excitation winding of the rotor 16 of the synchronous machine 17, and is designed to generate the excitation current by rectifying an excitation three-phase voltage generated by the main excitation machine 5 and to regulate the current intensity of the excitation current that can be supplied to the rotor 16 of the synchronous machine 17. For this purpose, the adjusting unit 18 is connected by communication means to a regulating electronics system 19. The adjusting unit 18 comprises at least one controllable rectifier unit, not shown.

The auxiliary excitation machine 9 generates an auxiliary excitation three-phase current that is regulated and rectified by means of the regulating unit 27, in order to supply a direct current to the main excitation machine 5, or to the external-pole windings thereof. The regulating unit 27 regulates the current intensity of an auxiliary excitation direct current to be supplied to the main excitation machine 5, in dependence on the intensity of a magnetic flux, sensed by the sensing device 26, between the rotor 7 and the stator 8 of the main excitation machine 5, as intended to be indicated by the broken line 28. The regulating electronics system 19 controls the adjusting unit 18 in dependence on the current intensity of a three-phase current to be generated by the synchronous machine 17, as intended to be indicated by the broken line 29 in FIG. 2.

FIG. 3 shows a schematic and perspective representation of a main excitation machine 5 of an exemplary embodiment for a brushless excitation system 15 according to the invention. The stator 8 of the main excitation machine 5 comprises eight external-pole windings 20, which are connected via a common core assembly 21 in the form of a circular ring, for which purpose there are radially inwardly extending projections 22, which extend through the external-pole windings 20, realized on the core assembly 21. The main excitation machine 5 additionally has a rotor 7, having three rotor windings 23 that are indicated by their inductors. When the excitation system 15 is in operation, a magnetic field, which is indicated by the arrows 24, is generated in the main excitation machine 5, between the external-pole windings 20 and the rotor windings 23. By means of an excitation system 15 according to the invention, the magnetic flux associated with this magnetic field can be kept constant independently of a current intensity of the excitation current to be supplied to the excitation winding of the rotor 16 of the synchronous machine 17.

Although the invention has been illustrated and described in greater detail by the preferred exemplary embodiments, the invention is not limited by the disclosed examples, and other variations may be inferred therefrom by persons skilled in the art, without departure from the scope of the invention.

The invention claimed is:

1. A regulating device for a brushless excitation system for supplying at least one excitation winding of a rotor of a synchronous machine with an excitation current, the regulating device comprising:
   at least one sensing device operative to generate a signal responsive to a magnetic flux generated between a rotor and a stator of a main excitation machine;
   at least one regulating unit, connected between an auxiliary excitation machine and the main excitation machine, and designed to generate an auxiliary excitation direct current that is supplied to the main excitation machine by rectifying an auxiliary excitation three-phase current generated by the auxiliary excitation machine, and which is designed to regulate a current intensity of the auxiliary excitation direct current in a manner responsive to the signal such that the magnetic flux generated between the rotor and the stator of the main excitation machine is kept constant; and
   at least one adjusting unit, which is connected in a rotationally fixed manner to a rotor shaft of the synchronous machine, is connected between the rotor of the main excitation machine and the excitation winding of the rotor of the synchronous machine, and is designed to generate the excitation current by rectifying an excitation three-phase voltage generated by the main excitation machine and to regulate a current intensity of the excitation current that is supplied to the rotor of the synchronous machine.

2. The regulating device as claimed in claim 1, wherein the adjusting unit has at least one controllable rectifier unit.

3. The regulating device as claimed in claim 1, wherein the synchronous machine comprises a turbogenerator.

4. A brushless excitation system for supplying at least one excitation winding of a rotor of a synchronous machine with an excitation current, comprising:
   at least one main excitation machine, realized as a rotating electrical external-pole machine, which has a rotor, having rotor windings, that is connected in a rotationally fixed manner to a rotor shaft of the synchronous machine, and which has a stator having external-pole windings, wherein the rotor windings are connectable in an electrically conducting manner to the excitation winding of the rotor of the synchronous machine;
   at least one auxiliary excitation machine, realized as a permanently excited electrical internal-pole machine, which has a rotor, having permanent magnets, that is connected in a rotationally fixed manner to the rotor shaft of the synchronous machine, and which has a stator having stator windings, wherein the stator windings are connectable in an electrically conducting manner to the external-pole windings of the main excitation machine; and
   at least one regulating device as claimed in claim 1.

5. The brushless excitation system as claimed in claim 4, wherein the synchronous machine comprises a turbogenerator.

6. A method for supplying at least one excitation winding of a rotor of a synchronous machine with an excitation current, the method comprising:
   generating a constant excitation three-phase voltage by a main excitation machine, a rotor of which is connected in a rotationally fixed manner to the rotor of the synchronous machine;
   generating the excitation current by rectifying the constant excitation three-phase voltage by an adjusting unit that is connected in a rotationally fixed manner to the rotor of the synchronous machine; and
   regulating a current intensity of the excitation current by the adjusting unit,
   wherein the constant excitation three-phase voltage is generated by regulating a supply of the main excitation machine with a rectified auxiliary excitation three-phase current generated by an auxiliary excitation machine by sensing an intensity of a magnetic flux generated between the rotor and a stator of the main excitation machine and controlling the rectified auxiliary excitation three-phase current in response to the sensed intensity of the magnetic flux such that the magnetic flux is held constant.

7. The method as claimed in claim 6, wherein at least one controllable rectifier unit is used as the adjusting unit.

8. The method as claimed in claim 6, wherein the synchronous machine comprises a turbogenerator.

9. An improvement for a brushless excitation system of a generator, the brushless excitation system including a main excitation machine providing an excitation current to a rotor of the generator and an auxiliary excitation machine providing an excitation current to the main excitation machine, the improvement comprising:
   a means for measuring an intensity of a magnetic flux generated between a stator and a rotor of the main excitation machine; and
   a means for controlling the intensity of the magnetic flux responsive to an output of the means for measuring;
   wherein the means for measuring the intensity of the magnetic flux further comprises a flux sensing device disposed in the main excitation machine; and
   further comprising:
   a regulating unit connected to receive a signal from the flux sensing device and operable to control an auxiliary excitation direct current supplied by the auxiliary excitation machine to the main excitation machine in a manner responsive to the signal such that the intensity of the magnetic flux generated between the stator and the rotor of the main excitation machine remains constant.

10. The improvement for a brushless excitation system of a generator of claim 9, further comprising:
   an adjusting unit comprising a controllable rectifier unit connected between the rotor of the main excitation machine and the rotor of the generator and operable to control the excitation current supplied to the rotor of the generator in response to a current intensity of a current generated by the generator without changing the constant intensity of the magnetic flux of the main excitation machine.

11. A turbogenerator comprising the improvement of claim 9.

12. A turbogenerator comprising the improvement of claim 10.

* * * * *